United States Patent
Lev

(10) Patent No.: US 11,759,054 B2
(45) Date of Patent: Sep. 19, 2023

(54) ELECTRIC DEEP COOKER

(71) Applicant: Brandon Eli Lev, Peoria, AZ (US)

(72) Inventor: Brandon Eli Lev, Peoria, AZ (US)

(*) Notice: Subject to any disclaimer, the term of this patent is extended or adjusted under 35 U.S.C. 154(b) by 459 days.

(21) Appl. No.: 17/141,268

(22) Filed: Jan. 5, 2021

(65) Prior Publication Data

US 2022/0175188 A1 Jun. 9, 2022

Related U.S. Application Data

(60) Provisional application No. 63/121,273, filed on Dec. 4, 2020.

(51) Int. Cl.
| | |
|---|---|
| *A47J 37/12* | (2006.01) |
| *A47J 37/06* | (2006.01) |
| *H02J 7/00* | (2006.01) |
| *A47J 43/18* | (2006.01) |
| *A47J 37/04* | (2006.01) |
| *H05B 3/44* | (2006.01) |
| *F24C 7/04* | (2021.01) |
| *F24C 7/06* | (2006.01) |

(52) U.S. Cl.
CPC ....... *A47J 37/1261* (2013.01); *A47J 37/0688* (2013.01); *A47J 37/128* (2013.01); *A47J 37/1209* (2013.01); *A47J 37/1266* (2013.01); *A47J 37/1295* (2013.01); *A47J 37/041* (2013.01); *A47J 43/18* (2013.01); *F24C 7/04* (2013.01); *F24C 7/06* (2013.01); *H02J 7/0045* (2013.01); *H05B 3/44* (2013.01)

(58) Field of Classification Search
CPC ............. A47J 37/1261; A47J 37/0688; A47J 37/1209; A47J 37/1266; A47J 37/128; A47J 37/1295; A47J 43/18; F24C 7/00; F24C 7/06; H02J 7/0045; H05B 3/44

USPC .......... 219/441; 126/39; 121/90, 92
See application file for complete search history.

(56) References Cited

U.S. PATENT DOCUMENTS

| | | | | |
|---|---|---|---|---|
| 2,641,681 A | * | 6/1953 | Willman | A47J 31/20 337/341 |
| 4,502,374 A | * | 3/1985 | Davis | A21B 5/08 99/449 |

(Continued)

FOREIGN PATENT DOCUMENTS

KR 101891541 B1 * 8/2018

OTHER PUBLICATIONS

Machine English Translation of KR-101891541-B1 (Year: 2018).*

*Primary Examiner* — Sang Y Paik
*Assistant Examiner* — Erwin J Wunderlich
(74) *Attorney, Agent, or Firm* — Bruce A. Lev

(57) ABSTRACT

An electric deep cooker including a main body and cover adapted to fully enclose food therein that includes a plurality of main electric heating elements connected along the interior surfaces of the main body and cover and are adapted to uniformly heat and cook food through its entire outer surface from the outside in, and further includes an electric interior heating element attached to the cover and adapted to be placed within the food being cooked and thereby heat and cook the food from the inside out while the plurality of main heating elements heat and cook the food from the outside in, to thereby uniformly and properly heat and cook the food, and in a shorter amount of time, than prior art electric deep cookers, and without the need to rotate the food within the main body of the electric deep cooker.

15 Claims, 5 Drawing Sheets

(56) References Cited

U.S. PATENT DOCUMENTS

| | | | | |
|---|---|---|---|---|
| 5,611,327 | A * | 3/1997 | Teixeira Filho | F24C 3/124 |
| | | | | 219/412 |
| 6,199,473 | B1 * | 3/2001 | Dotan | A47J 37/0664 |
| | | | | 99/332 |
| 6,834,577 | B2 * | 12/2004 | Xu | A47J 37/047 |
| | | | | 99/427 |
| 6,917,018 | B1 * | 7/2005 | Wong | F24C 7/06 |
| | | | | 99/421 V |
| 8,065,954 | B2 * | 11/2011 | Foster | A47J 36/00 |
| | | | | 99/336 |
| 11,589,709 | B1 * | 2/2023 | Intil | A47J 43/00 |
| 2007/0102418 | A1 * | 5/2007 | Swank | A21B 3/02 |
| | | | | 219/400 |
| 2015/0285777 | A1 * | 10/2015 | Baumann | G01N 27/226 |
| | | | | 73/64.56 |
| 2015/0327724 | A1 * | 11/2015 | Jo | A47J 27/004 |
| | | | | 99/348 |
| 2018/0192825 | A1 * | 7/2018 | Popeil | A47J 43/18 |
| 2020/0224880 | A1 * | 7/2020 | Billman | F24C 7/083 |
| 2022/0183340 | A1 * | 6/2022 | Tieman | A47J 37/1285 |

\* cited by examiner

ELECTRIC DEEP COOKER

CROSS-REFERENCE TO RELATED APPLICATION

The present application is related to and claims priority from prior provisional application Ser. No. 63/121,273, filed Dec. 4, 2020 which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

The present invention relates generally to the field of cooking apparatuses and more specifically to electric deep cookers and fryers.

2. Description of the Related Art

Known deep cookers and fryers all cook food from the outside in but lack the ability to cook food from the inside out at the same time, thereby resulting in food either being undercooked on the inside and/or burnt on the outside. Furthermore, the time needed to cook food within the prior art deep cookers and fryers is long and inconvenient. The applicant's previous patent, U.S. Pat. No. 10,765,261, entitled "Electric Skewers and Cooking Apparatuses" introduces the concept of cooking food from the inside out while also cooking from the outside in at the same time. The "rotisserie" embodiment of this prior invention relies on a "unidirectional" outer heating source, the electric barbecue, which radiates heat in an upward direction while food is being rotated and heated a distance there above, while also being cooked from the inside out via the electric skewer rotisserie. However, in order to cook the food evenly from the outside in via the electric barbecue the electric skewer rotisserie and food thereon need to be rotated 360 degrees continuously until the food is cooked completely and evenly, which leads to the problem of twisting and eventually damaging associated electrical wires while transmitting electricity to its heating element.

Therefore, a need exists for an electric deep cooker that can cook food from the outside in while also cooking the food from the inside out to properly cook the food evenly throughout, in a shorter amount of time, and without the need to rotate the food while heating and cooking to avoid the above-mentioned problems.

BRIEF SUMMARY OF THE INVENTION

In view of the foregoing disadvantages inherent in the known electric deep cookers and electric skewers and cooking apparatuses, the present invention provides a novel electric deep cooker. The general purpose of the present invention, which will be described subsequently in greater detail, is to provide an electric deep cooker having a main body and cover adapted to fully enclose food therein that includes a plurality of primary electric heating elements connected along the interior surface of the main body and cover and adapted to uniformly heat and cook food through its entire outer surface from the outside in, and further includes an electric interior heating element attached to the cover and adapted to be placed within the food being cooked and thereby heat and cook the food from the inside out while the plurality of primary heating elements heat and cook the food from the outside in, to thereby uniformly and properly heat and cook the food, and in a shorter amount of time, than prior art electric deep cookers, and without the need to rotate the food within the main body of the electric deep cooker.

The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, An Electric Deep Cooker, constructed and operative according to the teachings of the present invention.

The various embodiments of the present invention will hereinafter be described in conjunction with the appended drawings.

DETAILED DESCRIPTION

As discussed above, embodiments of the present invention relate to an electric deep cooker having a main body and cover adapted to fully enclose food therein that includes a plurality of primary electric heating elements connected along the interior surface of the main body and cover and adapted to uniformly heat and cook food through its entire outer surface from the outside in, and further includes an electric interior heating element attached to the cover and adapted to be placed within the food being cooked and thereby heat and cook the food from the inside out while the plurality of primary heating elements heat and cook the food from the outside in, to thereby uniformly and properly heat and cook the food, and in a shorter amount of time, than prior art electric deep cookers, and without the need to rotate the food within the main body of the electric deep cooker.

Figure 1:
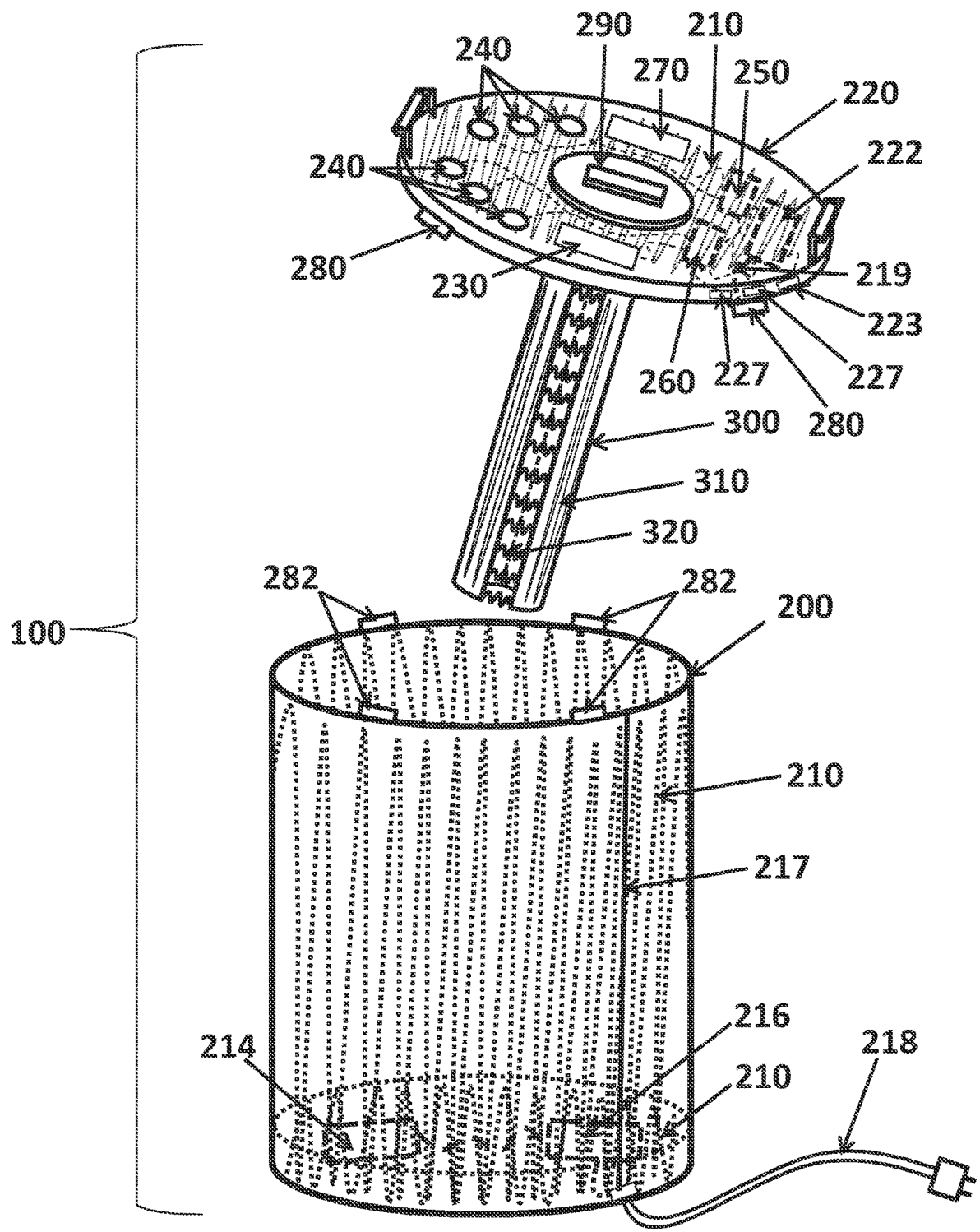
FIG. 1 shows a perspective view illustrating an Electric Deep Cooker according to the preferred embodiment of the present invention.

Referring now to the drawings FIG. 1, the electric deep cooker 100 includes a main body 200 and cover 220 adapted to fully enclose food therein that includes a plurality of primary electric heating elements 210 connected along the interior surface of the main body 200 and cover 220 and adapted to uniformly heat and cook food through its entire outer surface from the outside in, and further includes an elongated electric interior heating element 300 attached to the cover 220, having secondary electric heating elements 310 and 320, and is adapted to be placed within the food being cooked and thereby heat and cook the food from the inside out while the plurality of primary electric heating elements 210 heat and cook the food from the outside in, to thereby uniformly and properly heat and cook the food, and in a shorter amount of time, than prior art electric deep cookers, and without the need to rotate the food within the main body of the electric deep cooker.

The main body 200 further includes primary electric heating elements temperature control member 214 and battery member 216 electrically connected thereto. A power source can be formed as a power cord 218 connected to battery member 216 to supply external power thereto and thereby to primary electric heating elements temperature control member 214, the plurality of primary electric heating elements 210, the battery member 222 of cover 220, and the secondary electric heating elements 310 and 320. Main body power cord 217 and cover power cord 219 are releasably connected together when the cover 220 is releasably connected to the main body 200 and transfer power from power cord 218 to battery member 222 of cover 220. As such, the main body 200 and its elements can be powered from battery member 216 or from power cord 218, and the elements of cover 220 can be powered from battery member 222 or from power cord 218. The cover 220 can also receive power to its battery member 222 via charging port 223 and an external power source.

Cover 220 further includes a computer processor 260, control panel 230, which can be formed using touch pad technology, and control knobs 240, each electrically connected to transceiver 250 and battery member 222. Furthermore, the primary electric heating elements temperature control member 214 in the main body 200 includes a transceiver and communicates with transceiver 250 of cover 220. As such, control panel 230 and control knobs 240 can control the plurality of primary electric heating elements 210 of the main body 200 and cover 220. Control options include temperature, cooking duration, and cooking start and stop times. Transceiver 250 can also communicate with external controllers via radio transmissions, including BLUETOOTH technology. The cover 220 further includes a main display screen 270 that can display information including current temperatures of the plurality of primary electric heating elements 210 and secondary electric heating elements 310 and 320 of the electric interior heating element 300, the current time, cooking time, and cooking time remaining. Other control members can be connected via USB ports 227.

When releasably connecting cover 220 to main body 200, latch members 280 of cover 220 releasably and securely connect with latch members 282 of main body 200. At the same time main body power cord 217 and cover power cord 219 releasably and securely connect to one another for power transfer via magnetic members, or clips, or any other known means of releasably connecting power cords.

Figure 2:
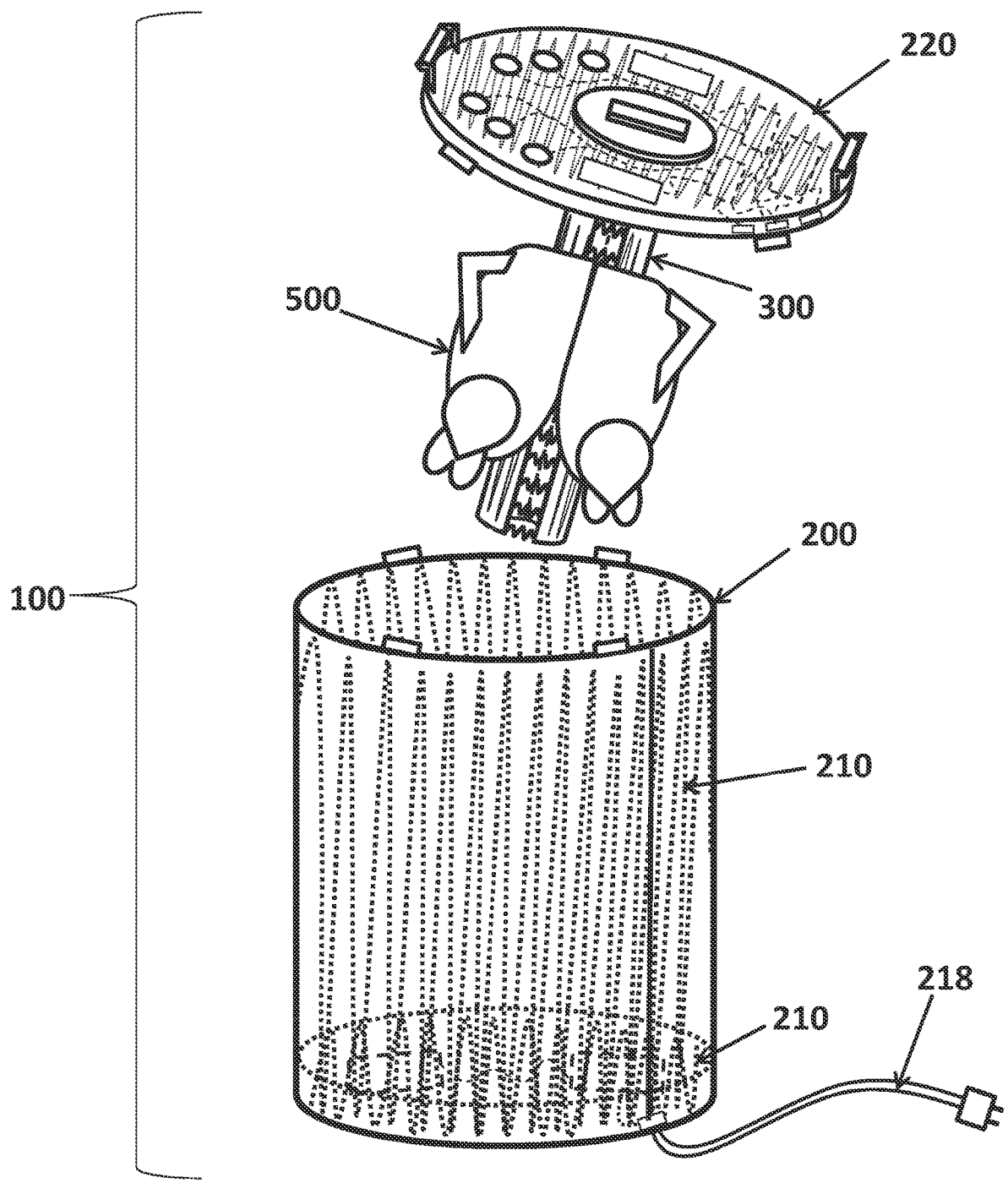
FIG. 2 shows a perspective view illustrating the Electric Deep Cooker according to the preferred embodiment of the present invention of FIG. 1, with the electric interior heating element placed within a turkey carcass.
Figure 3:
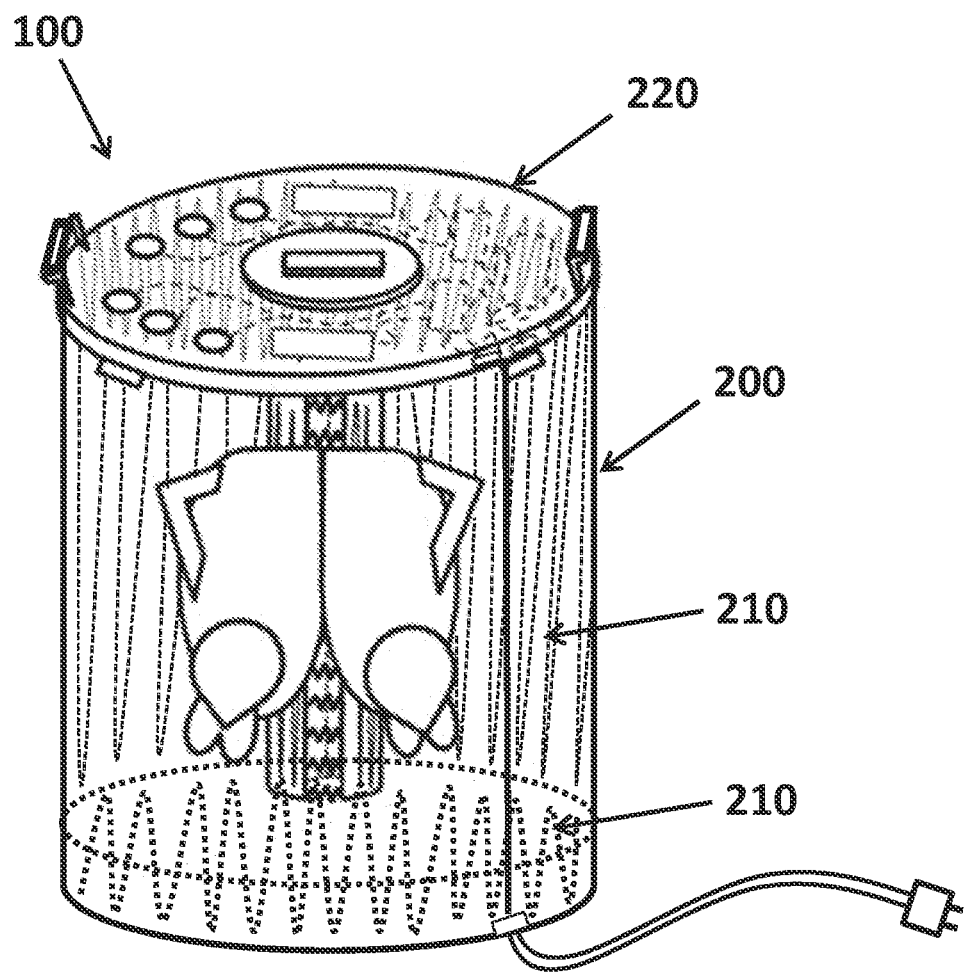
FIG. 3 shows another perspective view illustrating the Electric Deep Cooker according to the preferred embodiment of the present invention of FIG. 1, with the electric interior heating element placed within a turkey carcass and together placed within the main body for cooking.

As shown in FIGS. 2 and 3, the electric interior heating element 300 of cover 220 is inserted into the interior of the food chosen, for example a turkey carcass 500. Then the electric interior heating element 300 and turkey carcass 500 is inserted into the main body 200 and the cover 220 is securely attached to the main body 200. From there, either battery members 216 and 222 are used to power the electric deep cooker 100, or the power cord 218 is connected to an external power source, ie., a 220 volt A.C. power supply, to power the electric deep cooker 100, and the control panel 230 and control knobs 240 are used to choose a cooking setting, ie., temperatures and time of cooking, and cooking can commence.

Figure 4:
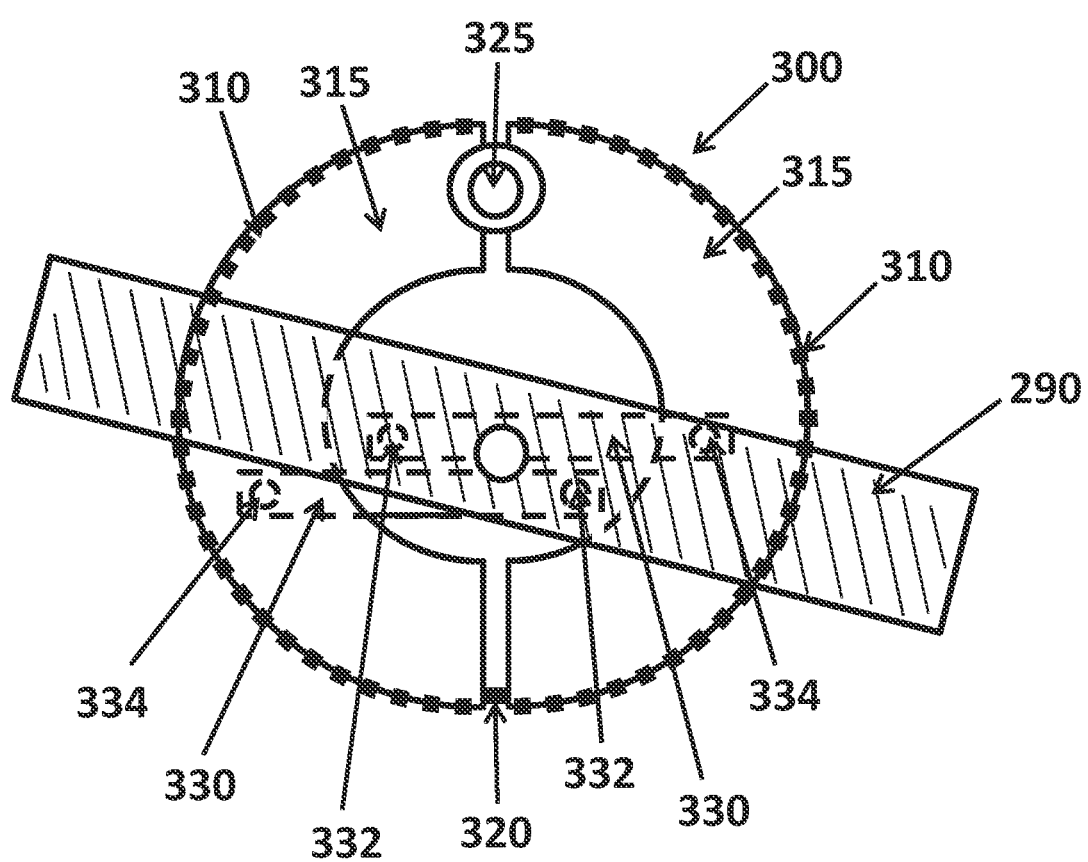
FIG. 4 shows a top view illustrating the electric interior heating element and the mechanism for changing the external diameter thereof for accommodating differing sized carcasses.
Figure 5:
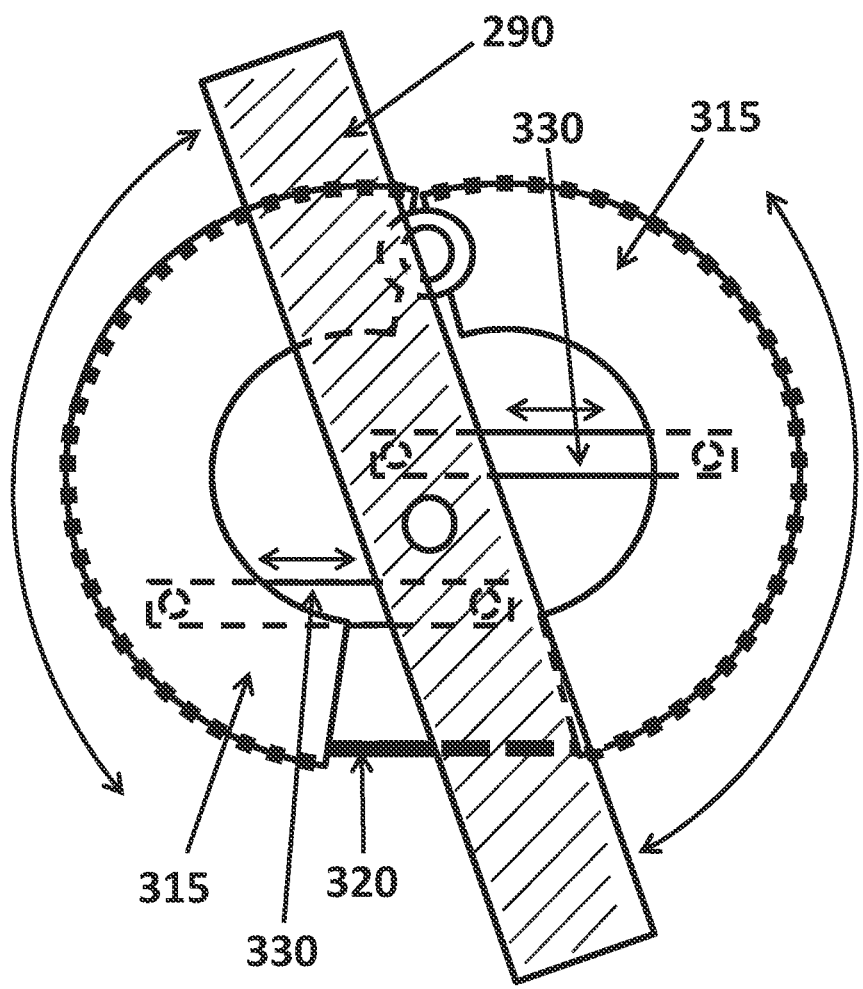
FIG. 5 shows a top view illustrating the electric interior heating element and the mechanism for changing the external diameter thereof for accommodating differing sized carcasses of FIG. 4, wherein the handle is turned and the external diameter is changed.

As shown in FIGS. 4 and 5, the external diameter of the electric interior heating element 300 can be adjusted to fit more appropriately into the interior volume of differing sized food members, such as turkeys, chickens, pigs, etc. To accomplish this, cover 220 further includes a rotating handle 290 having two elongated rods 332 extending downwardly therefrom, through an aperture in cover 220, and rotatably connecting to respective proximal ends of linkages 330 that are located within the interior volume formed by the electric interior heating element 300. The electric interior heating element 300 is formed including two elongated tube sections 315 having semi-hemispherical cross-sections connected to one another via elongated hinge 325. The secondary electric heating elements 320 are extendable and retractable, ie., formed as springs, and connected to and extend between respective adjacent side edges of the two tube sections 315, are electrically connected to secondary electric heating elements 310, and are adapted to heat up and cook the food as well even when extended or retracted. The linkages 330 are also connected at their respective distal ends to respective elongated tube sections 315 via linkage attachments 334, which can be formed as loops, rings, hooks, pins and/or depressions formed upon the interior walls of tube sections 315. Furthermore, the linkages can also be formed or cast as one piece with each respective tube section, and as such, the linkages would only pivot with respect to their respective elongated rod 332. As such, when handle 290 is rotated linkages 330 either push or pull on the elongated tube sections 315 and they will pivot with respect to one another via elongated hinge 325, and be held at the chosen position via friction between handle 290 and the top surface of cover 220, or via protrusions extending from the top surface of cover 220, or via an optional ratchet mechanism between handle 290 and the top surface of cover 220. Furthermore, when the handle is rotated in a first direction the two linkages push the two elongated tube sections causing them to pivot away from one another thereby increasing the external diameter of the cylindrical tube of the elongated interior heating element, and wherein when the handle is rotated in a second direction the two linkages pull the two elongated tube sections causing them to pivot toward one another thereby decreasing the external diameter of the cylindrical tube of the elongated interior heating element, wherein the external diameter of the elongated interior heating element can be adjusted to fit within different sized interiors of material being cooked within the deep cooker.

The interior heating element 300 can be formed from more than two halves, and include other means for expanding or contracting to increase or decrease the external diameter thereof, such as a rotating ratcheting mechanism, a linear rack and pinion, or a rotating wedge. The distal end of the interior heating element 300 may also be formed having a full or partial cone shape to thereby aid with inserting the interior heating element 300 into the interior of the food, ie., turkey carcass. The interior heating element 300 may also include a thermometer connected to the computer processor 260 of the cover 200 to thereby provide a means to monitor the interior temperature of the food before, during, and after cooking. The thermometer may also aid in any computer programming inputted into the computer processor 260 used to automatically start, stop, and cook foods within the parameters of predetermined recipes.

Other embodiments and configurations can include fans to circulate the heat from the heating elements within the interior; cooking oil that transfers heat from the heating elements to the food and provides a means for basting and infusion of moisture and flavor into the food; holes through the cover along with syringes adapted to pass therethrough to inject liquids directly into the food while cooking; gas lines and gases, such as propane, included to provide a secondary means for heating when an external electric power source is not available or simply when desired. The gas lines can be included in both the main body 200 along the interior walls and within the interior heating element 300. It is even conceived that microwave elements can be substituted for the electric heating elements in both the main body, the cover, and the interior heating element to heat and cook the food.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A deep cooker comprising:
   a main body including:
      at least one side panel, each including:
         an exterior surface;
         an interior surface;
         a top edge portion; and
         a bottom edge portion;
      a bottom panel including:
         an exterior surface;
         an interior surface; and
         at least one side edge portion;
         wherein said at least one side edge portion is connected to said bottom edge portion of each of said at least one side panel;
      wherein said at least one side panel and said bottom panel define an interior volume; and
      a plurality of primary heating elements;
         wherein said plurality of primary heating elements are connected to said interior surface of said at least one side panel; and
         wherein said plurality of primary heating elements are adapted to heat the interior volume of said main body;
   a cover including:
      a top panel including:
         an exterior surface;
         an interior surface;
         at least one side edge portion;
         wherein said top panel is adapted to be securely and releasably connected to said top edge portion of each of said at least one side panel of said main body; and
      an elongated interior heating element including:
         an elongated hollow cylindrical tube including:
            a proximal end;
            a distal end;
            an interior surface;
            an exterior surface; and
            an external diameter;
         a plurality of secondary heating elements;
            wherein said plurality of secondary heating elements are connected to said elongated hollow cylindrical tube;
         wherein said elongated interior heating element is connected at said proximal end to, and extends perpendicularly from, a center section of said interior surface of said top panel; and
      wherein when said top panel is securely and releasably connected to said top edge portion of each of said at least one side panel of said main body, said elongated interior heating element extends into said interior volume of said main body;
      an aperture;
         wherein said aperture extends through said center section of said top panel;
      a handle;
         wherein said handle is adapted to rotate upon said exterior surface of said top panel and above said aperture;
      two elongated rods, each including:
         a proximal end;
         a distal end; and
         a length therebetween;
         wherein said two elongated rods are spaced from one another and connected to said handle at their respective proximal ends, and are adapted to extend through said aperture and into said elongated hollow cylindrical tube of said elongated interior heating element;
      wherein said elongated hollow cylindrical tube of said elongated interior heating element is formed comprising:
         two elongated tube sections, each including:
            a linkage attachment;
               wherein said linkage attachment is formed on an interior surface of each elongated tube section;
            wherein each of said two elongated tube sections are formed having a semi-cylindrical cross-section; and
         an elongated hinge;
            wherein said elongated hinge is connected between adjacent edges of said two elongated tube sections and is adapted to allow said two elongated tube sections to pivot with respect to one another; and
      two linkages, each including:
         a proximal end;
            wherein said proximal end includes an aperture therethrough adapted to receive one of said two elongated rods therethrough; and
         a distal end;
            wherein said distal end includes an aperture therethrough adapted to pivotally connect with said linkage attachment of a respective one of said two elongated tube sections;
      wherein when said handle is rotated in a first direction said two linkages push said two elongated tube sections causing them to pivot away from one another thereby increasing said external diameter of the cylindrical tube of said elongated interior heating element; and wherein when said handle is rotated in a second direction said two linkages pull said two elongated tube sections causing them to pivot toward one another thereby decreasing said external diameter of the cylindrical tube of said elongated interior heating element;

wherein said external diameter of said elongated interior heating element can be adjusted to fit within different sized interiors of material being cooked within said deep cooker; and a power source;

wherein said power source is electrically connected to said plurality of primary heating elements and to said plurality of secondary heating elements and is adapted to provide power to said plurality of primary heating elements and to said plurality of secondary heating elements;

wherein said plurality of primary heating elements are adapted to heat at least the entire outer layer of material placed within said deep cooker;

wherein said elongated interior heating element of said cover is adapted to be inserted into an interior portion of said material to be cooked within said deep cooker before said cover is securely and releasably connected to said main body; and wherein when said cover is securely and releasably connected to said main body, said deep cooker is adapted to cook said material from the inside out and the outside in simultaneously.

2. The deep cooker of claim 1, wherein said plurality of primary heating elements are formed as electric heating elements; wherein said plurality of secondary heating elements are formed as electric heating elements; and wherein said power source is formed as an electrical power source.

3. The deep cooker of claim 1, wherein said bottom panel of said main body further includes at least one primary heating element connected to said interior surface thereof, is electrically connected to said power source, and is adapted to further heat said interior volume of said main body.

4. The deep cooker of claim 1, wherein said top panel of said cover further includes at least one primary heating element connected to said interior surface thereof, is electrically connected to said power source, and is adapted to further heat said interior volume of said main body.

5. The electric deep cooker of claim 1, wherein said at least one side panel of said main body includes at least one releasable connector attached upon said top edge portion thereof; wherein said top panel of said cover includes at least one releasable connector attached upon said at least one side edge portion thereof, such that each said at least one releasable connector of said main body is adapted to be releasably connected to said at least one releasable connector of said cover to thereby releasably and securely connect said cover to said main body.

6. The electric deep cooker of claim 1, wherein said main body further includes a rechargeable battery member electrically connected to said power source, to said plurality of primary heating elements, and to said plurality of secondary heating elements, such that when said power source is disconnected said rechargeable battery member provides power to said plurality of primary heating elements and to said plurality of secondary heating elements.

7. The electric deep cooker of claim 1, wherein said top panel of said cover further includes:

a computer processor;

wherein said computer processor is electrically connected to said power source, to said plurality of primary heating elements, and to said plurality of secondary heating elements; and a control panel;

wherein said control panel is connected to said exterior surface of said top panel;

wherein said control panel is electrically connected to said power source and said computer processor and is adapted to allow a user to input control information into said computer processor and is adapted to display information from said computer processor.

8. The electric deep cooker of claim 7, wherein said top panel of said cover further includes:

a transceiver;

wherein said transceiver is electrically connected to said power source and said computer processor and is adapted to receive and send information between said computer processor and an external controller.

9. The electric deep cooker of claim 1, wherein said main body is adapted to receive and retain cooking liquids therein; wherein said cooking liquids are adapted to transfer heat from said plurality of primary heating elements and said plurality of secondary heating elements to said material being cooked within said deep cooker.

10. The electric deep cooker of claim 1, wherein said main body is formed having a cylindrical shape; and wherein said top panel of said cover is formed having a disk shape.

11. The electric deep cooker of claim 1, wherein said top panel of said cover further includes a battery member and a charging port electrically connected to said battery member; wherein said battery member is adapted to be electrically charged via said power source, wherein said power source is an external power source.

12. The electric deep cooker of claim 7, wherein said top panel further includes at least one USB port electrically connected to said computer processor and said computer processor is adapted to allow a user to input control information into said computer processor via said at least one USB port.

13. The electric deep cooker of claim 5, wherein said power source is attached to said main body; and wherein said electric deep cooker further includes:

a main body power cord;

wherein said main power cord is connected to said exterior surface of said main body, and between said power source and one of said at least one releasable connector of said main body;

a cover power cord;

wherein said cover power cord connected is connected to said exterior surface of said cover, and between said at least one releasable connector of said top panel of said cover and said plurality of secondary heating elements of said elongated interior heating element;

wherein said one of said at least one releasable connector of said main body and said one of said at least one releasable connector of said top panel of said cover are adapted to conduct electricity, such that when said one of said at least one releasable connector of said main body and said one of said at least one releasable connector of said top panel of said cover are connected together electricity can flow from said power source to both of said primary heating elements of said main body and to said plurality of secondary heating elements of said elongated interior heating element of said cover.

14. The electric deep cooker of claim 5, wherein said power source is attached to said cover; and wherein said electric deep cooker further includes:
   a main body power cord;
      wherein said main power cord is connected to said exterior surface of said main body, and between said plurality of primary heating elements and one of said at least one releasable connector of said main body;
   a cover power cord;
      wherein said cover power cord connected is connected to said exterior surface of said cover, and between said power source and said one of said at least one releasable connector of said top panel of said cover;
   wherein said one of said at least one releasable connector of said main body and said one of said at least one releasable connector of said top panel of said cover are adapted to conduct electricity, such that when said one of said at least one releasable connector of said main body and said one of said at least one releasable connector of said top panel of said cover are connected together electricity can flow from said power source to both of said primary heating elements of said main body and to said plurality of secondary heating elements of said elongated interior heating element of said cover.

15. The electric deep cooker of claim 5, wherein said at least one releasable connector of said main body and said at least one releasable connector of said top panel of said cover are magnetic.

\* \* \* \* \*